United States Patent
Baraff et al.

(10) Patent No.: US 7,206,729 B2
(45) Date of Patent: Apr. 17, 2007

(54) INERTIAL FIELD GENERATOR: A METHOD FOR CONTROLLABLY COUPLING KINEMATIC CHARACTER MOTIONS TO DYNAMICALLY SIMULATED ELEMENTS

(75) Inventors: David E. Baraff, Emeryville, CA (US); Andrew Witkin, Emeryville, CA (US)

(73) Assignee: Pixar, Emeryville, CA (US)

( * ) Notice: Subject to any disclaimer, the term of this patent is extended or adjusted under 35 U.S.C. 154(b) by 876 days.

(21) Appl. No.: 09/750,100

(22) Filed: Dec. 29, 2000

(65) Prior Publication Data

US 2002/0113793 A1 Aug. 22, 2002

(51) Int. Cl.
- G06G 7/56 (2006.01)
- G06T 13/00 (2006.01)
- G06T 17/00 (2006.01)
- G06G 17/50 (2006.01)

(52) U.S. Cl. .................... 703/7; 345/420; 345/474
(58) Field of Classification Search ............ 703/7; 345/420, 474; 706/7

See application file for complete search history.

(56) References Cited

U.S. PATENT DOCUMENTS

| 5,594,856 | A | * | 1/1997 | Girard | 345/473 |
|---|---|---|---|---|---|
| 5,892,691 | A | | 4/1999 | Fowler | |
| 5,912,675 | A | | 6/1999 | Laperriere | 345/473 |
| 5,982,390 | A | * | 11/1999 | Stoneking et al. | 345/474 |
| 6,144,385 | A | * | 11/2000 | Girard | 345/424 |
| 6,326,963 | B1 | | 12/2001 | Meehan | 345/419 |
| 6,559,849 | B1 | * | 5/2003 | Anderson et al. | 345/474 |
| 6,738,065 | B1 | * | 5/2004 | Even-Zohar | 345/473 |
| 6,909,431 | B1 | | 6/2005 | Anderson et al. | 345/423 |

OTHER PUBLICATIONS

Witkin-A. et al. "Large Step in Cloth Simulation" ACM 1998 p. 43-54.*
Thalmann-N et al. "Virtual Clothes, Hair and Skin for Beautiful Top Models". IEEE 1996 p. 132-141.*
Witkin et al. "Interactive Manipulation of Rigid Body Simulations". ACM Jul. 2000 p. 209-217.*
Witkin-A et al. "Global Methods for Simulating Contacting Flexible Bodies" IEEE 1994 p. 1-12.*
Woolen-W. et al. "Animating Human Athletics" ACM 1995. p. 71-78.*
Thalman-N et al. "Computer Animation" ACM 1996 p. 161-163.*
Popovic et al. "Physically-based Motion Transformation" Siggraph 99, Los Angeles Aug. 8-13, 1999 p. 1-10.*
Popovic-Z. "Controlling Physics in Realistic Character Aniamation" ACM Jul. 2000 p. 51-59.*

(Continued)

*Primary Examiner*—Paul Rodriguez
*Assistant Examiner*—Thomas Stevens
(74) *Attorney, Agent, or Firm*—Townsend and Townsend and Crew LLP

(57) ABSTRACT

A method is described to let animators control the extent by which kinematically scripted character motions affect dynamically simulated objects' motions. The dynamic objects are connected to the kinematic character, such as clothing or hair, and the motion of the dynamic objects is simulated based on the motion of the kinematic character. Such control is important to produce reasonable behavior of dynamic objects in the presence of physically unrealistic kinematic character motion. An Inertial Field Generator (IFG) is employed to compensate for the unreasonable behavior of dynamic objects when the kinematic character undergoes unrealistic motion.

20 Claims, 3 Drawing Sheets

OTHER PUBLICATIONS

Chadwick et al., "Layered Construction for Deformable Animated Characters". Computer Graphis. vol. 23, No. 3, 1989.p. 243-252.*

Westenhofer et al., "Using Kinematic Clones to Control the Dynamic Simulation of Articulated Figures" 1996. p. 26-35; Rhythm & Hues Studios, Los Angeles.*

SIGGRAPH '95, Introduction to Physically-Based Modelling, 22nd International Conferencing on Computer Graphics and International Techniques, Los Angeles, CA, Aug. 1995.

Ascher, U., and Boxerman, E. 2003, On the modied conjugate gradient method in cloth simulation. (submitted to) The Visual Computer 19:526-531.

Baraff, D., and Witkin, A. 1998. Large steps in cloth simulation. Computer Graphics (Proc. SIGGRAPH), 1-12.

Berney, J., and Redd, J. 2000. Stuart Little. SIGGRAPH Course Notes, ACM SIGGRAPH, ch. Costumes, p. 1.

Breen, D., House, D., and Wozny, M. 1994. Predicting the drape of woven cloth using interacting particles. Computer Graphics (Proc. SIGGRAPH), 365-372.

Bridson, R., Fedkiw, R., and Anderson, J. 2002. Robust treatment of collisions, contact, and friction for cloth animation. Computer Graphics (Proc. SIGGRAPH), 594-603.

Carignan, M., Yang, Y., Magenenat-Thalmann, N., and Thalmann, D. 1992. Dressing animated synthetic actors with complex deformable clothes. Computer Graphics (Proc. SIGGRAPH), 99-104.

Choi, K., and Ko, H. 2002. Stable but responsive cloth. Computer Graphics (Proc. SIGGRAPH), 604-611.

Cordier, F., Volino, P., and Thalmann, N. 2002. Integrating deformations between bodies and clothes. The Journal of Visualization and Computer Animation 12:45-53.

DeRose, T., Kass, M., and Truon, T. 1998. Subdivision surfaces in computer animation. Computer Graphics (Proc. SIGGRAPH), 85-94.

Eberhardt, B., Weber, A., and Strasser, W. 1996. A fast, flexible, particlesystem model for cloth draping. IEEE Computer Graphics and Applications 16:52-59.

Gottschalk, S., Lin, M., and Manocha, D. 1996. OBBTree: A hierarchical structure for rapid interference detection. Computer Graphics (Proc. SIGGRAPH), 171-180.

Krishnan, S., and Manocha, D. 1997. An efficient surface intersection algorithm based on lowerDimensional formulation. ACM Transactions on Graphics 16, 1 (Jan.), 76-106. ISSN 0730-0301.

Lander, Skin Them Bones: Game Programming for the Web Generation, May 1998, Game Developer (www.gdmag.com), pp. 11-16.

Lander, Slashing through Real-Time Character Animation, Apr. 1998, Game Developer (www.gdmag.com), pp. 13-16.

Meyer, M., Debunne, G., Desbrun, M., and Barr, A. 2001. Interactive animation of clothlike objects in virtual reality. The Journal of Visualization and Computer Animation 12:1-12.

Patrikalakis,N. 1993. Surface-to-surface intersections. IEEE Computer Graphics and Applications 13, 1, 89-95.

Provot, X. 1995. Deformation constraints in a massspring model to describe rigid cloth behavior. In Graphics Interface, Graphics Interface, 147-155.

Stoeger et al., How to Create Long Hair with Maya Paint Effects and Maya Cloth, Alias/Wavefront, Corporate Overview, 4 pages.

Terzopoulos, D., and Fleischer, K. 1988. Deformable models. Visual Computer 4, 306-331.

Terzopoulos, D., Platt, J., Barr, A., and Fleischer, K. 1987. Elastically deformable models. Computer Graphics (Proc. SIGGRAPH) 11:205-214.

Volino, P., Courchesne, M., and Magnenat Thalmann, N. 1995. Versatile and efficient tecniques for simulating cloth and other deformable objects. Computer Graphics (Proc. SIGGRAPH), 137-144.

Watt et al., "Advanced Animation and Rendering Techniques" ACM Press, 1992, pp. 418-420.

Cordier et al., "Integrated System for Skin Deformation," MIRALab, University of Geneva, Computer Animation 2000 (CA'00), 2000. pp. 2-8.

* cited by examiner

INERTIAL FIELD GENERATOR: A METHOD FOR CONTROLLABLY COUPLING KINEMATIC CHARACTER MOTIONS TO DYNAMICALLY SIMULATED ELEMENTS

BACKGROUND OF THE INVENTION

1. Field of the Invention

The present invention relates generally to animation and more specifically to computer animation of characters. The present invention is also directed to providing animators with greater control over aspects of the character to produce reasonable changes in those aspects even when the character undergoes unrealistic motion.

2. Description of the Related Art

Traditional animation techniques allow the animator to create the apparent motion of animated characters, to be viewed by a viewer of the animation. The use of computers to simplify the animation process has provided many benefits to the traditional hand-drawn process. Computer animated characters are well known in the prior art and have been used in many different capacities. Such characters are utilized in traditional movies, videos and online streaming of moving pictures, as well as interactive movies where the motion of characters is often initiated by a user.

Often times in the animation of characters, the characters have "secondary elements", such as clothing and hair, that are responsive to main motion of the characters. The motions of some secondary elements in computer graphics imagery are often too complex for an animator to directly control. Instead of a human animator determining the motion of these secondary elements, computer programs use physically-based numerical methods that simulate the motion of these secondary elements (such as hair or cloth) over time.

This is accomplished by modeling the physical properties of these dynamic elements (how the cloth bends due to forces or collisions with solid objects, how the hair deforms or collides with itself), the external forces on these elements (gravity, wind) and the motions of the kinematic elements (the characters that cloth rests on or that the hair grows out of). The animation of the kinematic elements is provided by the animator and is independent of and unaffected by anything that the dynamic elements do.

For concreteness, consider an animation of a superhero wearing a long cape: The superhero (the kinematic element, Captain IFG), FIG. 1a, is directly animated by a skilled human animator, while the motion of the superhero's cape (the dynamic element) in response to the superhero's animation is simulated using physically-based numerical techniques.

If the physical properties and external forces acting on the dynamic elements are accurately modeled, the resulting motion will be plausible and seemingly realistic: cloth will hang down and fold naturally, hair will droop or blow in the wind. However, it is often the case that the kinematic elements (the primary characters of the scene) may be animated in a physically exaggerated manner, yet this requires the dynamic elements to essentially ignore this exaggeration and continue to behave in a realistic manner.

As an example assume the superhero stands motionless for a moment, then abruptly accelerates upward at 100G's (98,000 cm/s$^2$). See FIG. 1b. His cape, tied around his neck, drapes down his back while the superhero is motionless, but must then react to the superhero's enormous upward motion. The result of the simulation program in this situation is to accelerate the portions of the cape around the superhero's neck along with the superhero.

The rest of the cape, unfortunately, does not fare so well; the physical properties of the cloth dictate that the superhero will have moved a large distance before the bottom edge of the cape "realizes" that the top edge around his neck has moved. This delay is caused because forces do not propagate instantly through cloth. Equivalently, one can think of the cape suddenly weighing 100 times more than it used to, so it initially stretches to many times its normal length.

While physically correct, this is not the desired behavior of the cape. Because of this effect, an animator must change the response of the dynamic elements to achieve the desired result. As discussed above, the dynamic elements are oftentimes complex and difficult for the animator to control. This is often frustrating for the animator, since the animator has achieved the proper motion of the kinematic elements and should not have to deal with unrealistic motion of the dynamic elements that are simulated by physically-based numerical techniques.

SUMMARY OF THE INVENTION

Accordingly, it is a principal object of the present invention to provide a method to allow an animator to control how kinematic elements' motions affects the simulation of the dynamic elements. The present invention provides a compensation for dynamic elements whose motion is unrealistic because of the motion of the kinematic elements and does not require individual manipulation of the dynamic elements on a per frame basis to achieve the desired motions.

The present invention is directed to a method of simulating relative motion of objects in computer animation. That process includes providing a motion of a kinematic object, providing at least one dynamic object associated with the kinematic object, where motions of the at least one dynamic object are based on the motion of the kinematic object, and selectively manipulating the motions of the at least one dynamic object to simulate physical motion.

The method selectively manipulates the dynamic objects by compensating for unreasonable motions of the dynamic objects when the kinematic object undergoes exaggerated motion. More particularly, that compensation occurs when the exaggerated motion includes accelerations that are unrealistic for humans.

In addition, the method can also compensate for the unreasonable motions of the dynamic objects when the kinematic object undergoes accelerated motions above a predetermined limit. Thus, the compensation need not occur until the acceleration of the kinematic object is greater than a certain limit.

The method is applicable to when the kinematic object is an animated character and the dynamic elements are coupled to the animated character. Additionally, the dynamic elements may represent hair or clothing attached to the animated character.

Also, the dynamic objects may include a first set of dynamic objects and a second set of dynamic objects and in the stop of selectively manipulating the motions of the dynamic object, each set of dynamic objects is manipulated with respect to separate reference points on the kinematic object. In addition, the dynamic objects may selectively be manipulated with reference to a plurality of reference points coupled to those dynamic objects.

The above and other objects, features and advantages of the invention will become apparent from the following description of the preferred embodiment taken in conjunction with the accompanying drawings.

BRIEF DESCRIPTION OF THE DRAWINGS

FIG. 1 illustrates a kinematic character.

DESCRIPTION OF THE PREFERRED EMBODIMENTS

The present invention is directed to a method for controllably coupling kinematic character motions to dynamically simulated elements. This control is accomplished through the use of an Inertial Field Generator (IFG). The use of the IFG allows an animator to control how kinematic element's motions affects the simulation of the dynamic elements.

In the context of the present application, kinematic and dynamic objects, or elements, can be, in the preferred embodiments, collections of data points having connections between the data points. These collections of data points are used to form elements of computer animation images. These data points are entered into a computer system and those data points are used to form the images. Through manipulation of the data points, the images are changed on a per frame basis to simulate motion. The kinematic objects described herein are preferably characters that are animated and interact with other elements in the animation scene.

Figure 1A:
FIG. 1a is an illustration of a kinematic character having dynamic elements.
Figure 1B:
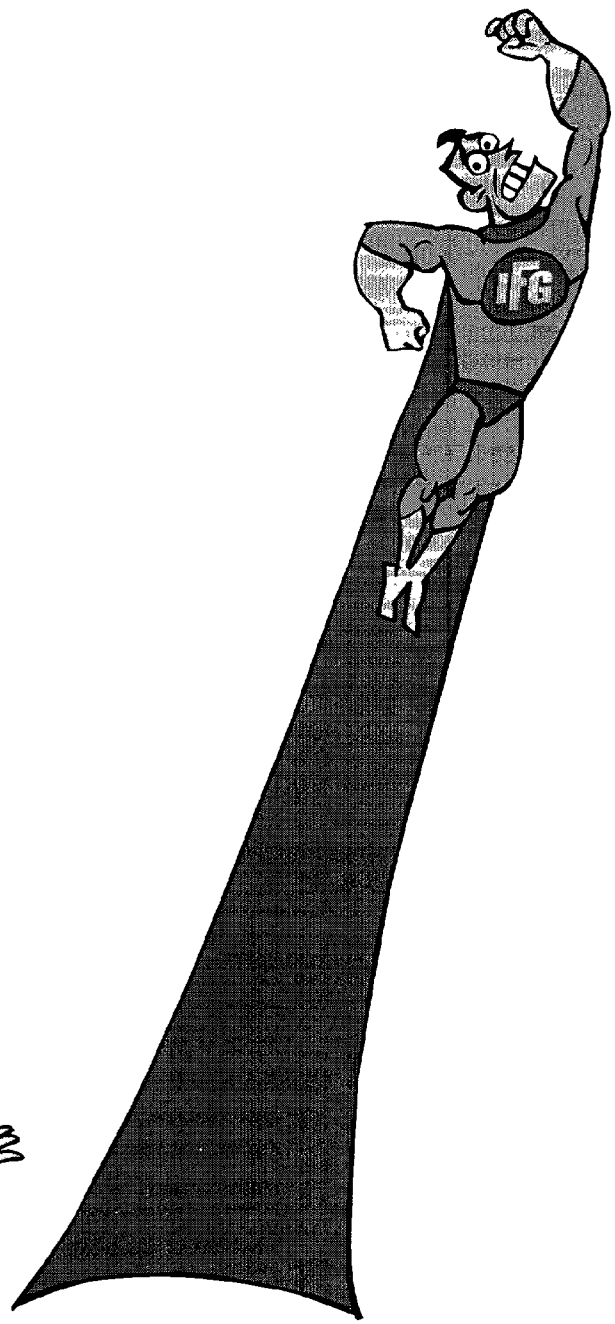
FIG. 1b presents the illustration of FIG. 1a when the kinematic character undergoes unrealistic motion.

In the superhero example illustrated in FIGS. 1a and 1b, an IFG is used so that the cape would "feel" only a small fraction (or even none at all) of the superhero's upward acceleration, and would thus not stretch appreciably. Thus, the use of the IFG would allow the superhero's cape to appear as it does in FIG. 1a, even though the superhero is being simulated as moving through unrealistic motion.

Another example would be a character wearing a shirt who jumps off a cliff. In that case, the animator might exaggerate the character's motion so that the fall is faster than gravity allows for. Yet, visually the animator may wish to avoid the shirt flying up over the character's head as would realistically happen. Likewise, a fur-covered character might wave its arms extremely energetically, but the animator may want the dynamic fur's motion to reflect only some portion of this vigorous motion.

Figure 2:
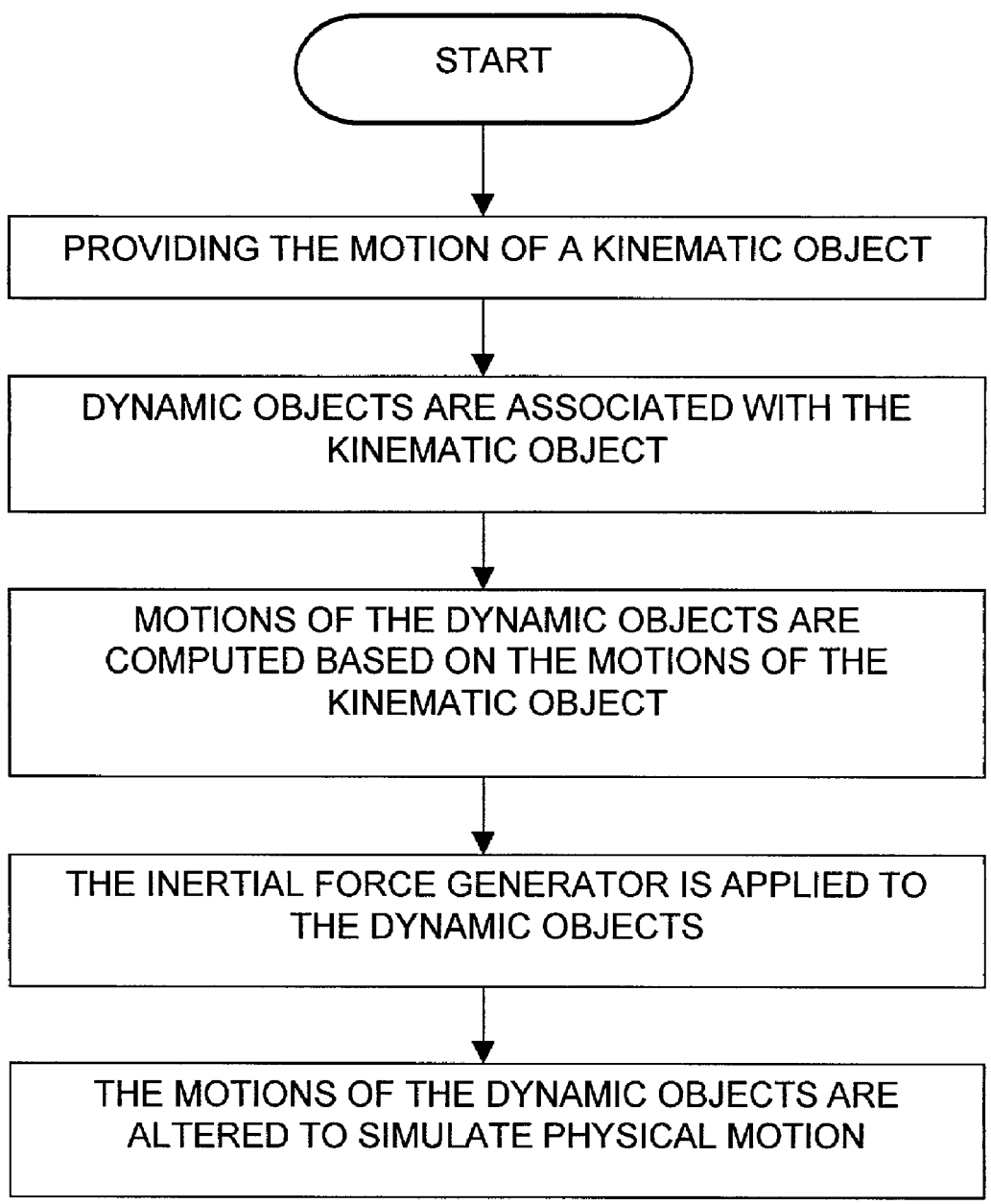
FIG. 2 is a flow chart illustrating the general method of the present invention.

The methodology employed to apply the IFG will now be discussed with respect to FIG. 2. FIG. 2 illustrates the general method used. First, the motion of a kinematic object is provided. This is supplied by the animator and is usually provided on a per frame basis. Dynamic objects are associated with the kinematic object, where the motions of dynamic objects are based on the motion of the kinematic object. The kinematic object can be an animated character and the dynamic objects are attributes of that character, such as hair and/or clothing. Lastly, the motions of the dynamic objects are selectively manipulated to simulate physical motion. The IFGs allow the motions of the dynamic objects to be controlled so that their motion does not become unrealistic even when the kinematic object moves in ways that are not possible in the unanimated world.

A common component of all physically-based simulation is that forces acting on the dynamic elements are part of the input to the simulation. An IFG is a specifically constructed force-field that is added to the simulation, in such a way as to compensate for unwanted accelerations in a kinematic character's animation. An IFG works by measuring acceleration in the kinematic character, and adding some portion of that acceleration to the dynamic elements. Essentially then, an IFG is a coupling device between a kinematic character, and a dynamic element whose motion is likely to be highly dependent on the kinematic character's motion.

Figure 3:
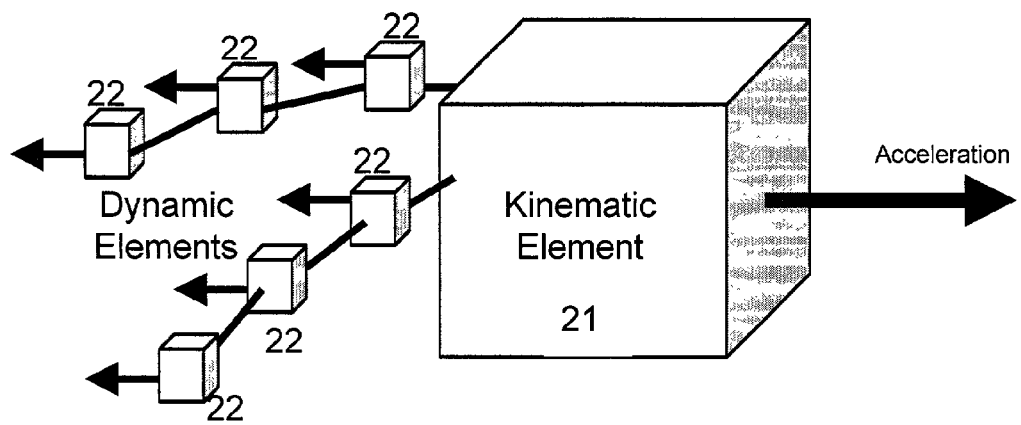
FIG. 3 is a schematic showing the connections between a kinematic element and dynamic elements, and the response of the dynamic elements based on the acceleration of the kinematic element.
Figure 4:
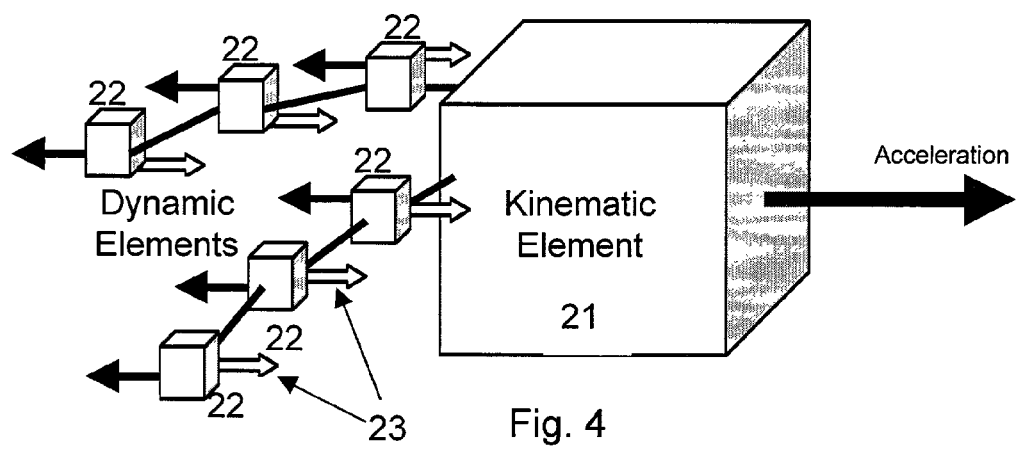
FIG. 4 schematic showing the connections between a kinematic element and dynamic elements, and the application of the inertial field generator to the dynamic elements to compensate for the reaction of the dynamic elements to the acceleration of the kinematic element.

For simplicity, it is assumed that the dynamic element consists of n particles, with the ith particle having mass $m_1$ Such dynamic elements consisting of particles 22 are illustrated in FIGS. 3 and 4. While the examples provided herein discuss the representation of the dynamic elements as a series of particles, IFGs that act on continuum objects are just as easily defined. Each particle i in the dynamic element is associated with a predetermined motion of a reference point $p_i \in R^3$, that is, at time t, the reference point for the ith particle has location $p_{i(t)}$. In FIGS. 3 and 4 the reference point is denoted by element 21.

The motion of the reference points defines an acceleration field, some portion of which the animator wants to pass along to the dynamic particles. Thus, for each particle i a filtering function $G_i$ is defined whose input and output is an acceleration in $R^3$. Given these definitions, at time t the IFG imparts on particle i a force $f_i(t)$ defined by:

$$f_i(t) = m_i G_i(\ddot{p}_i(t))$$

where $$\ddot{p}_i(t) = \frac{d}{dt^2} p_i(t)$$

is the acceleration of $p_i$. This force is illustrated by the white arrows 23. shown in FIG. 4. Examples of different IFGs and their use will now be described.

In a first embodiment, IFG uses a single reference point. In the example of the superhero, FIG. 1, assume that the superhero is accelerating upward abruptly. His cloth cape consists of a number of dynamic particles. For each particle, the same reference point $p_i = p_c$ is chosen, where $p_c$ is the location of a point approximately centered in the superhero's body.

If $G_i$ is defined as:

$$G_i(\ddot{p}_c(t)) = \alpha \ddot{p}_c(t) \qquad (2)$$

then for $\alpha=1$, the motion of $p_c$ is completely canceled out. That is, the entire cape feels an accelerating force that exactly matches the motion of $p_c$ over time. When the superhero accelerates upward at 100G's, a compensating 100G upward acceleration is imposed on the entire cape. As a result, the cape does not stretch appreciably—in fact, it does not react to the superhero's upward bound except to move exactly upward with the superhero. By varying $\alpha$, the amount of the superhero's acceleration that is imparted to the cape can be controlled.

Additionally, the output force from an IFG need not act in the same direction as the input acceleration. For example, if we wish the IFG to only affect vertical accelerations, then we could write $$G_i(\ddot{p}_c(t)) = \alpha(\ddot{p}_c(t) \cdot \hat{z})\hat{z} \quad (3)$$

where $\hat{z}$ is a unit vector along the vertical axis.

IFGs can also be more selective in their filtering ability. For example, suppose the animator wants the IFG to only compensate for accelerations that are unrealistic for humans. A normal human is limited to accelerations of only a few G's (say three): so that one might wish to compensate for the superhero's acceleration only to the extent that it exceeds $3 \cdot 980 = 2940$ cm/s². Setting $a_M = 2940$, the filter can be written:

$$G_i(\ddot{p}_c(t)) = \begin{cases} 0 & \text{if } \|\ddot{p}_c(t)\| < a_M \\ \left(1 - \dfrac{a_M}{\|\ddot{p}_c(t)\|}\right)\ddot{p}_c(t) & \text{if } \|\ddot{p}_c(t)\| \geq a_M \end{cases} \quad (4)$$

For input accelerations $\ddot{p}_c(t)$ with magnitude less than $a_M$, the output force is zero since $G_i$ is zero. As the magnitude of $\ddot{p}_c(t)$ reaches and exceeds $a_M$, the IFG begins outputting a greater and greater fraction of $\ddot{p}_c(t)$ onto the cloth. In this way, unrealistic motions of the kinematic character that cause problematic effects in the dynamic elements can be avoided.

In another embodiment, an IFG may use multiple reference points. Greater flexibility can be achieved by allowing each pi to track a different point on the kinematic character. Consider a character with long dynamic hair on its arms. The character moves it arms in different directions very energetically. To prevent the hair on the arms from stretching due to high accelerations of the arms, an IFG is employed.

However, since the right arm might move independently from the left arm, the hair on the right arm has to use a different reference point from the hair on the left arm. In fact, for this example, all the points in a given strand of hair should use $p_i(t) = p_r(t)$ where $p_r(t)$ is the root point of the hair (specifically, the point on the body that the hair is attached to). In general, each strand of hair is coupled to the motion of a different point $p_r(t)$. Obviously, the motions of points on the left arm can be quite different than the motion of points on the right arm. Using multiple independent reference points allows an IFG to take into account simultaneous motions by parts of the body that differ greatly in their direction and or intensity.

In another embodiment, the IFG uses a varying filter function. In the examples above, each filter function $G_i$ was the same. If one wished the response of the IFG to vary over a character, it is a simple matter to let the filter function $G_i$ vary from point to point. This might be done if the animator wished to smoothly vary the effects of the IFG over a character. For example, an animator might wish to have the effects of an IFG applied to the furry character's arms, but taper off in intensity for the fur on the torso.

IFGs greatly reduce excessively unrealistic motions from dynamic elements. Even when a kinematic character's motion is completely plausible, the IFG is still invaluable because it allows the animator to control how much of the character's base motion is transferred to the dynamic element. IFGs are easily applied to any sort of dynamic element (including, but not limited to, dynamic clothing, hair, fur, appendages, water, and vapor).

Although the embodiments discussed above provide for filtering function with certain parameters, the filtering functions $G_i$ can be specified in terms of an arbitrary number of control parameters. Additionally, both the filtering functions $G_i$ and the reference points can be functions of which dynamic particles they apply to. Thus, individual portions of the dynamic elements can be controlled to a fine degree.

Although embodiments of the present invention have been described in detail, it will be understood that the present invention is not limited to the above-described embodiments, and various modifications in design may be made without departing from the spirit and scope of the invention defined in claims.

What is claimed is:

1. A method of simulating relative motion of objects in computer animation comprising:
   providing a motion of a kinematic object, where the kinematic object is an element of a computer animation display;
   providing at least one dynamic object associated with said kinematic object, where said at least one dynamic object is another element of the computer animation display and where motion of said at least one dynamic object is influenced by the motion of the kinematic object, wherein the motion of said at least one dynamic object is simulated using a physically-based numerical technique;
   manipulating the motion of said at least one dynamic object in response to the motion of the kinematic object when the motion of the kinematic object exceeds a predetermined limit such that the motion of the at least one dynamic object is influenced differently by the motion of the kinematic object when the motion of the kinematic object exceeds the predetermined limit; and
   displaying the elements of the computer animation display, including associated motions of said elements.

2. A method of simulating relative motion of objects according to claim 1 wherein manipulating the motion of said at least one dynamic object comprises compensating for motions of said at least one dynamic object when the motion of the kinematic object exceeds the predetermined limit.

3. A method of simulating relative motion of objects according to claim 2 wherein the motion of said at least one dynamic object is manipulated when the motion of the kinematic object comprises accelerations that are unrealistic for humans.

4. A method of simulating relative motion of objects according to claim 2 wherein the manipulating comprises compensating for the motion of said at least one dynamic object when the kinematic object undergoes accelerated motions above a predetermined limit.

5. A method of simulating relative motion of objects according to claim 1 wherein said kinematic object is an animated character and said at least one dynamic object is coupled to the animated character.

6. A method of simulating relative motion of objects according to claim 5 wherein said at least one dynamic object is a representation of hair attached to the animated character.

7. A method of simulating relative motion of objects according to claim 5 wherein said at least one dynamic object is a representation of clothing attached to the animated character.

8. A method of simulating relative motion of objects according to claim 1 wherein said at least one dynamic object comprises a first set of dynamic objects and a second set of dynamic objects and manipulating the motion of said at least one dynamic object comprises selectively manipulating motions of said first set of dynamic objects with respect to a first reference point on said kinematic object and selectively manipulating motions of said second set of dynamic objects with respect to a second reference point on said kinematic object.

9. A method of simulating relative motion of objects according to claim 1 wherein said at least one dynamic object comprises a plurality of dynamic objects coupled to a plurality of reference points on said kinematic object and wherein manipulating the motion of said at least one dynamic object comprises manipulating the motions of each of said plurality of dynamic objects with respect to said plurality of reference points coupled thereto.

10. A method of simulating relative motion of objects according to claim 9 wherein said kinematic object is an animated character and said plurality of dynamic objects are coupled to the animated character and said plurality of reference points are different points on the animated character.

11. A method of simulating relative motion of objects according to claim 9 wherein the manipulating comprises compensating for motions of said plurality of dynamic objects when the kinematic object undergoes exaggerated motion.

12. The method of claim 1 wherein manipulating the motion of said at least one dynamic object comprises manipulating the motion of the said at least one dynamic object when acceleration of the kinematic object exceeds the predetermined limit.

13. A computer animation system comprising:
a processor;
a display;
wherein the processor is configured to:
receive information specifying motion for a kinematic object;
compute motion for a dynamic object based upon the motion of the kinematic object, wherein the motion of the dynamic object is specified using a physically-based numerical technique; and
manipulate the motion of the dynamic object in response to the motion of the kinematic object when the motion of the kinematic object exceeds a predetermined limit such that the motion of the dynamic object is influenced differently by the motion of the kinematic object when the motion of the kinematic object exceeds the predetermined limit; and
wherein the display is configured to display the kinematic object and the dynamic object and their associated motions.

14. The method of claim 13 wherein the processor is configured to manipulate the motion of the dynamic object when acceleration of the kinematic object exceeds the predetermined limit.

15. The method of claim 13 wherein the kinematic object represents an animated character and the dynamic object represents a hair attached to the animated character.

16. The method of claim 13 wherein the kinematic object represent an animated character and the dynamic object represents clothing attached to the animated character.

17. A computer animation apparatus comprising:
means for receiving information specifying motion for a kinematic object;
means for computing motion for a dynamic object based upon the motion of the kinematic object, wherein the motion of the dynamic object is specified using a physically-based numerical technique;
means for manipulating the motion of the dynamic object in response to the motion of the kinematic object when the motion of the kinematic object exceeds a predetermined limit such that the motion of the dynamic object is influenced differently by the motion of the kinematic object when the motion of the kinematic object exceeds the predetermined limit; and
means for displaying the kinematic object and the dynamic object and their associated motions.

18. A computer program product stored on a computer-readable storage medium for simulating relative motion of objects, the computer program product comprising:
code for receiving information specifying motion for a kinematic object;
code for computing motion for a dynamic object based upon the motion of the kinematic object, wherein the motion of the dynamic object is specified using a physically-based numerical technique;
code for manipulating the motion of the dynamic object in response to the motion of the kinematic object when the motion of the kinematic object exceeds a predetermined limit such that the motion of the dynamic object is influenced differently by the motion of the kinematic object when the motion of the kinematic object exceeds the predetermined limit; and
code for displaying the kinematic object and the dynamic object and their associated motions.

19. A computer-implemented method of simulating relative motion of objects in computer animation, the method comprising:
receiving information specifying motion for a kinematic object;
computing motion for a dynamic object based upon the motion of the kinematic object, wherein the motion of the dynamic object is specified using a physically-based numerical technique;
manipulating the motion of the dynamic object in response to the motion of the kinematic object when the motion of the kinematic object exceeds a predetermined limit such that the motion of the dynamic object is influenced differently by the motion of the kinematic object when the motion of the kinematic object exceeds the predetermined limit; and
displaying the kinematic object and the dynamic object, including associated motions of the kinematic object and the dynamic object.

20. The method of claim 19 wherein manipulating the motion of the dynamic object comprises manipulating the motion of the dynamic object when acceleration of the kinematic object exceeds the predetermined limit.

* * * * *